United States Patent [19]

Evans et al.

[11] 4,399,506

[45] Aug. 16, 1983

[54] STORE-IN-CACHE PROCESSOR MEANS FOR CLEARING MAIN STORAGE

[75] Inventors: Charles W. Evans, Austin, Tex.; Frederick O. Flusche, Hyde Park, N.Y.; Benedicto U. Messina; Ethel L. Richardson, both of Poughkeepsie, N.Y.; James R. Robinson, Clinton Corners, N.Y.; Joseph A. Wetzel, New Paltz, N.Y.

[73] Assignee: International Business Machines Corporation, Armonk, N.Y.

[21] Appl. No.: 194,639

[22] Filed: Oct. 6, 1980

[51] Int. Cl.³ .................... G06F 13/00; G06F 9/06
[52] U.S. Cl. .................................................... 364/200
[58] Field of Search ... 364/200 MS File, 900 MS File; 5/451

[56] References Cited

U.S. PATENT DOCUMENTS

| | | | |
|---|---|---|---|
| 3,723,976 | 3/1973 | Alvarez et al. | 364/200 |
| 3,735,360 | 5/1973 | Anderson et al. | 364/200 |
| 3,771,137 | 11/1973 | Barner et al. | 364/200 |
| 4,056,844 | 11/1977 | Izumi | 364/200 |
| 4,136,386 | 1/1979 | Annunziata et al. | 364/200 |
| 4,152,764 | 5/1979 | Connors et al. | 364/200 |
| 4,280,176 | 7/1981 | Tan | 364/200 |
| 4,290,103 | 9/1981 | Hattori | 364/200 |
| 4,293,910 | 10/1981 | Flusche et al. | 364/200 |
| 4,314,331 | 2/1982 | Porter et al. | 364/200 |
| 4,317,168 | 2/1982 | Messina et al. | 364/200 |
| 4,332,010 | 5/1982 | Messina et al. | 364/200 |
| 4,342,084 | 7/1982 | Sager et al. | |

OTHER PUBLICATIONS

IBM System/370, Principles of Operation (Form Number GA22-7000), pp. 133-135.

Primary Examiner—James D. Thomas
Assistant Examiner—Archie E. Williams
Attorney, Agent, or Firm—Bernard M. Goldman

[57] ABSTRACT

Inhibit means prevents a store-in-cache (SIC) from requesting or receiving any line fetch from MS when a clear line (CL) command is issued by a CPU to main storage (MS).

Two CPU modes are provided: (1) an initial storage validation mode and (2) an instruction processing mode. The system operator controls the first mode so that a CPU can execute the CL command during system initialization without any prior data fetch from MS. In the second mode, the CL command is executed as a component of a program instruction fetched from MS that can clear a block in main storage.

In a multiprocessor (MP), the CL command by any CPU requests a line store of pad data into an addressed line in MS only after each other SIC copy directory is searched and any found conflicting line is invalidated. Line castout to MS is prohibited for a conflicting line found in a cache by the CS command, which would have been a normal operation for other types of CPU commands. After any line conflict is found for any other cache in the MP, the completion of the CL command is delayed by cancelling the line pad write request to MS. Then the IE repeatedly reissues the CL command until all found conflicting lines are invalidated. As soon as no conflict is found in any copy directory, the currently issued CL command is completed by not cancelling the pad data request to MS, so that pad bytes are then written into the line in MS.

19 Claims, 18 Drawing Figures

FIG. 2A  IE CLEARLINE (CL) CMD TO BCE

| PSW STORAGE KEY | LOGICAL ADDRESS | SPECIAL ACCESS BIT | CLEARLINE OP CODE |
|---|---|---|---|
| (4 BIT) | (32 BITS) | (1 BIT) | (8 BITS) |

FIG. 2B  BCE CLEARLINE CMD TO SC

| PSW STORAGE KEY | ABSOLUTE ADDRESS | #DW (0001) | CL OP CODE | CPU ID |
|---|---|---|---|---|
| (4 BITS) | (27 BITS) | (4 BITS) | (8 BITS) | (2 BITS) |

FIG. 2C  SC INV/CO CMD TO BCE

| DIRECTORY CLASS ADDRESS | DIRECTORY SET ADDRESS | CLEARLINE BIT | CASTOUT BIT | INVALIDATE BIT |
|---|---|---|---|---|
| (8 BITS) | (4 BITS) | (1 BIT) | (1 BIT) | (1 BIT) |

FIG. 2D  BCE INVALIDATE SC DIRECTORY ENTRY CMD

| DIRECTORY CLASS ADDRESS | DIRECTORY SET ADDRESS | NON MS REQ | OP CODE FOR INVALIDATING SC DIR ENTRY | CP ID |
|---|---|---|---|---|
| (8 BITS) | (4 BITS) | (1 BIT) | (8 BITS) | (2 BITS) |

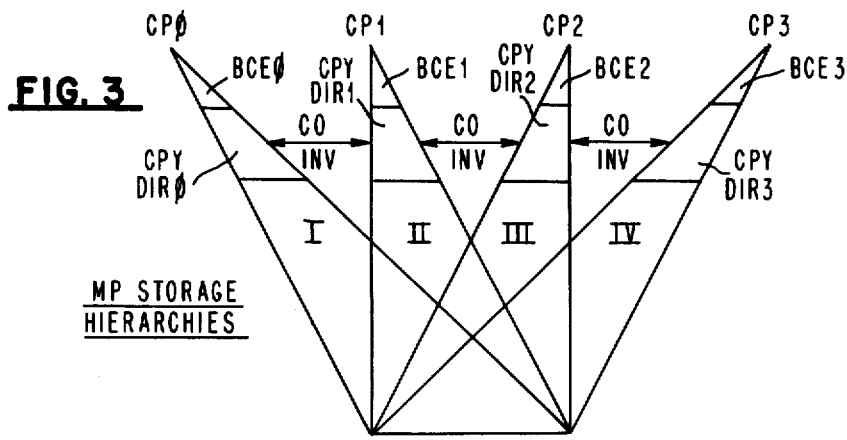

FIG. 3

MP STORAGE HIERARCHIES

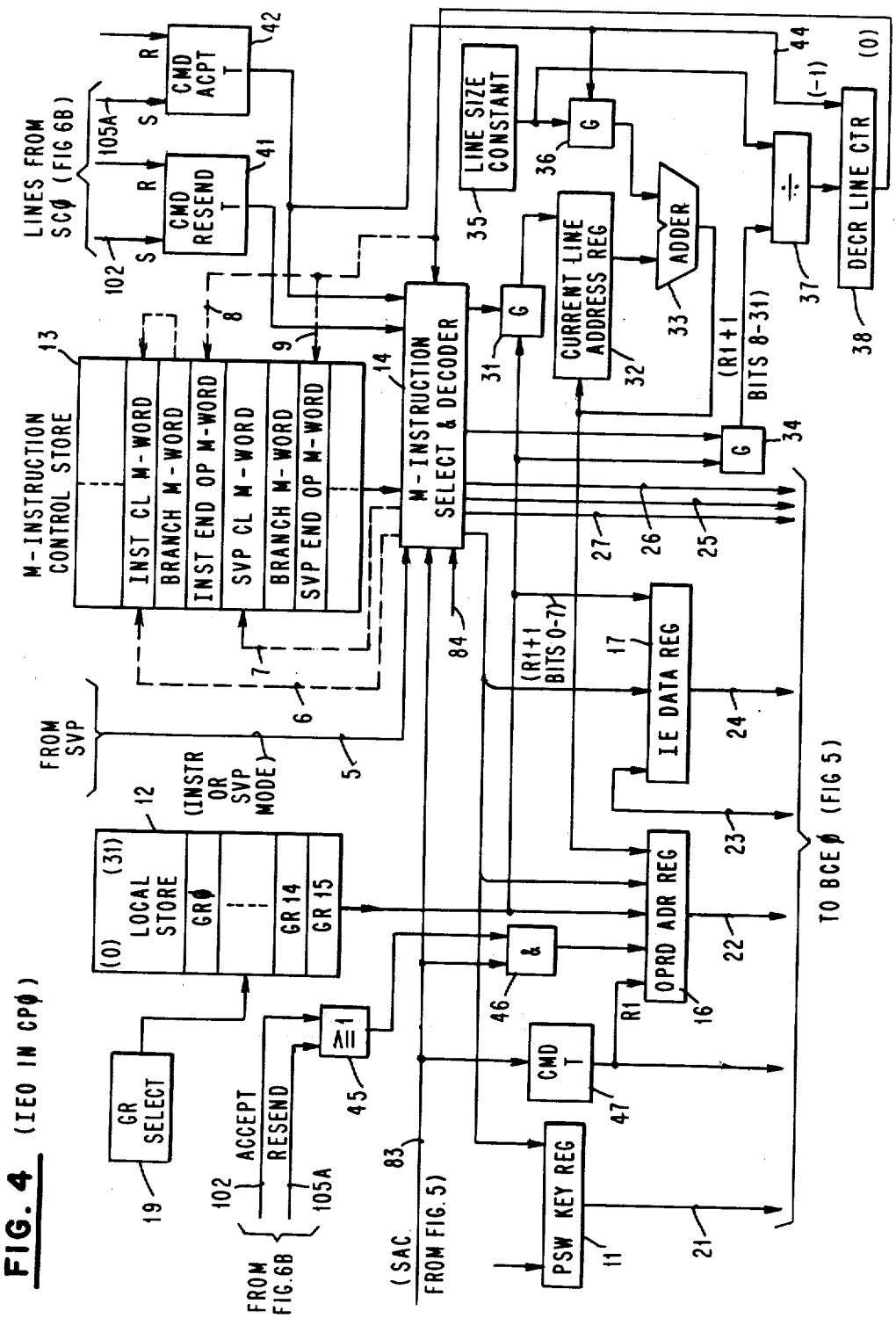

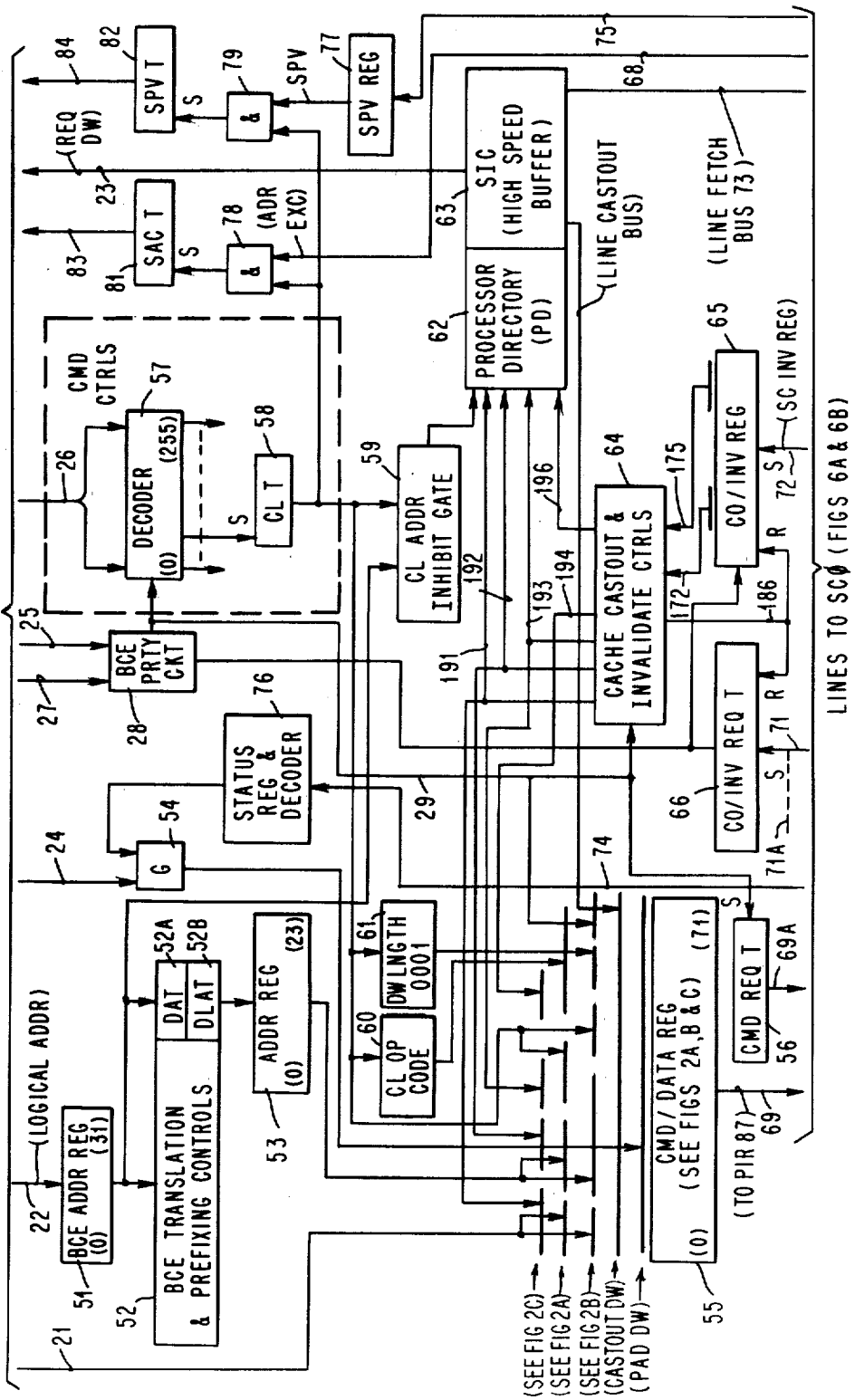

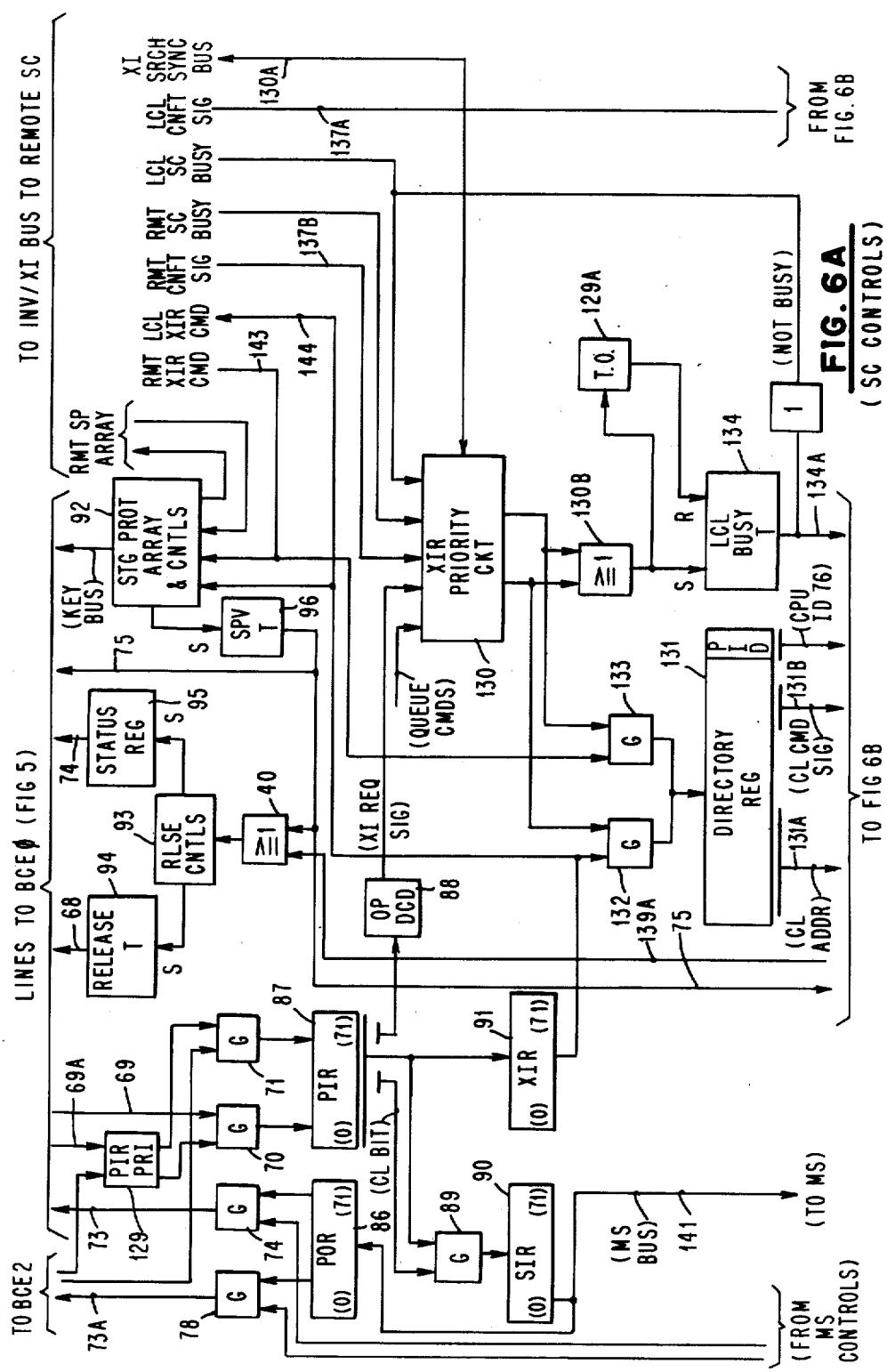

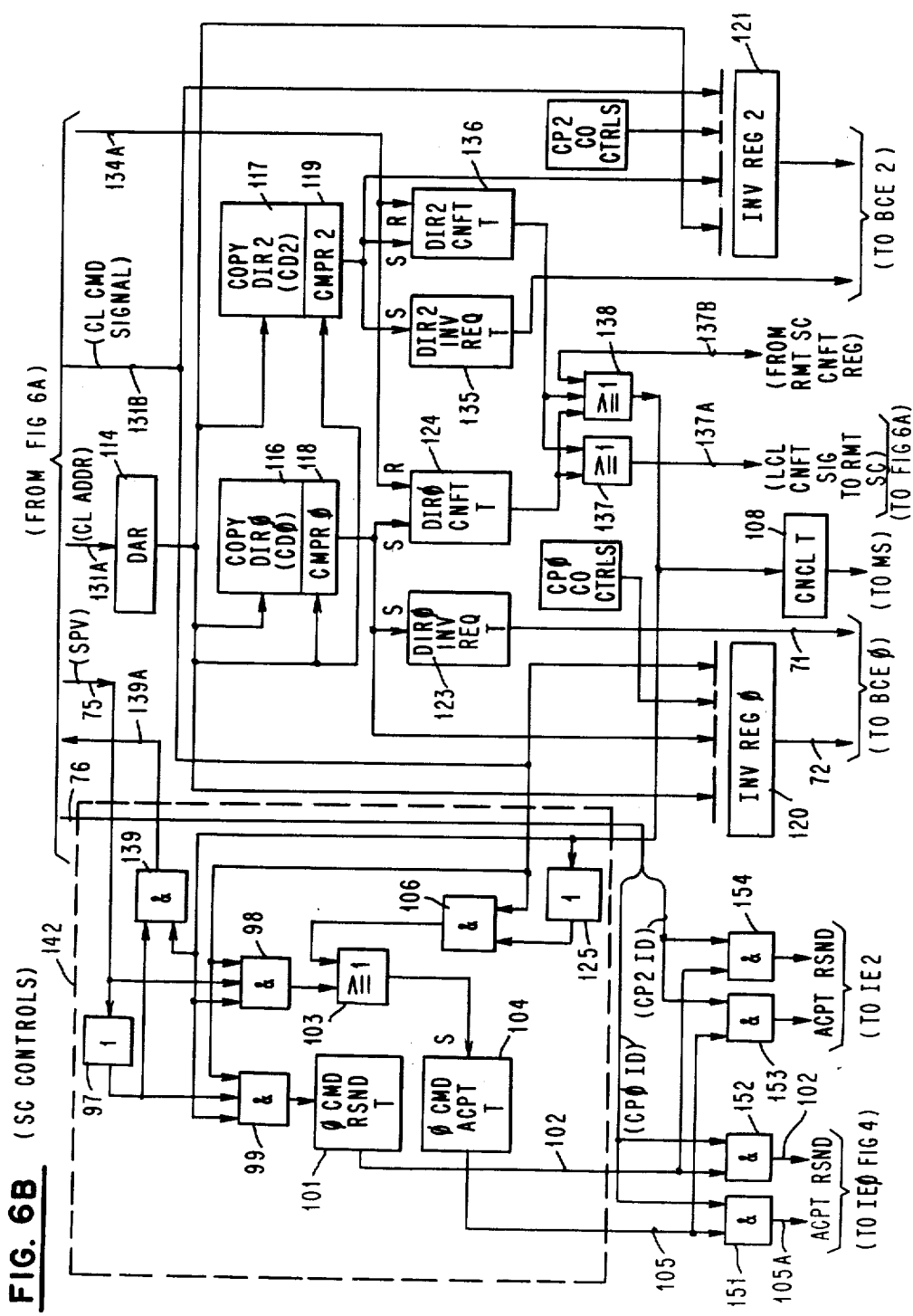
FIG. 6B (SC CONTROLS)

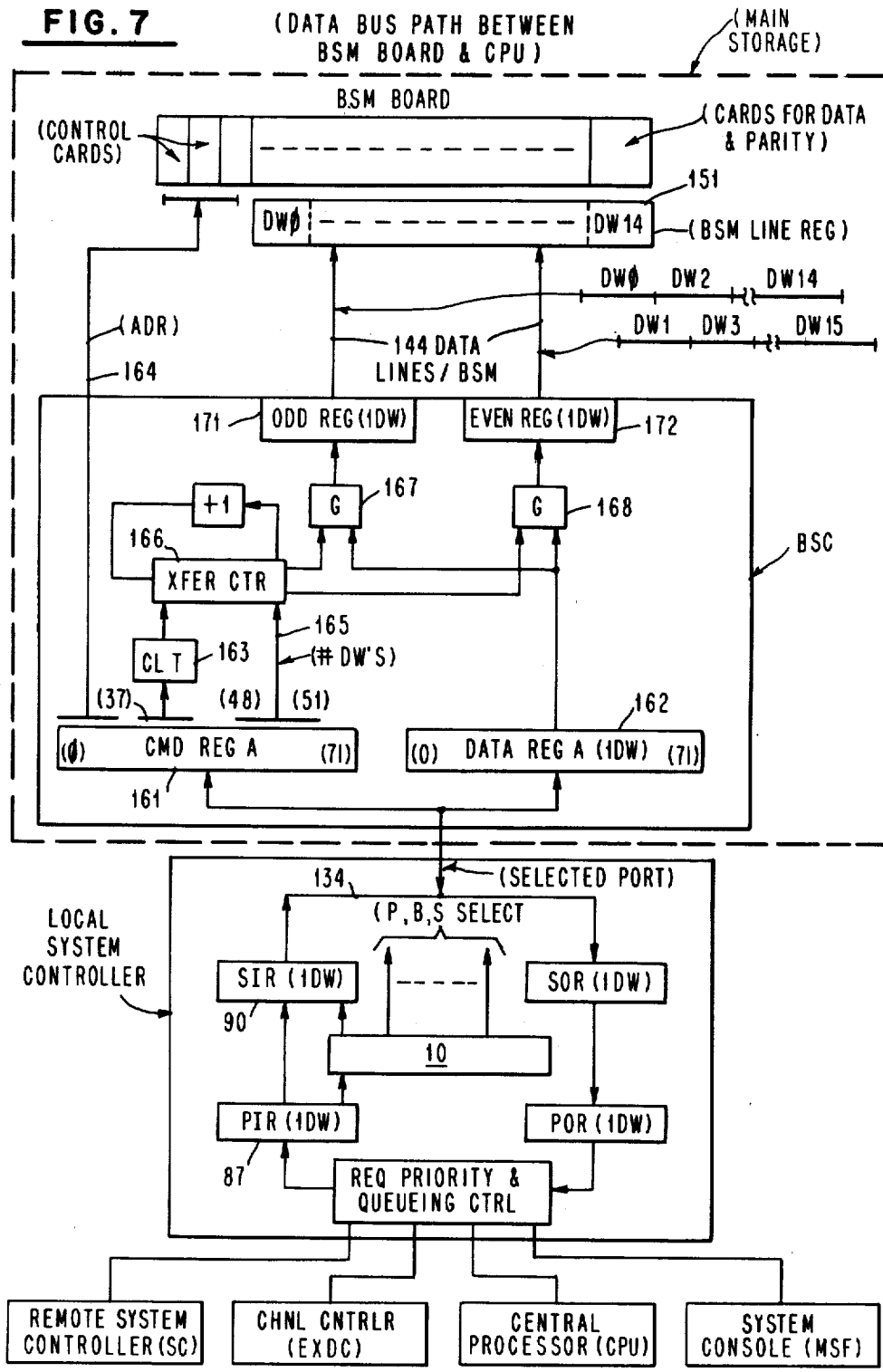
FIG. 7 (DATA BUS PATH BETWEEN BSM BOARD & CPU)

(CACHE CASTOUT & INVALIDATE CONTROL 64)

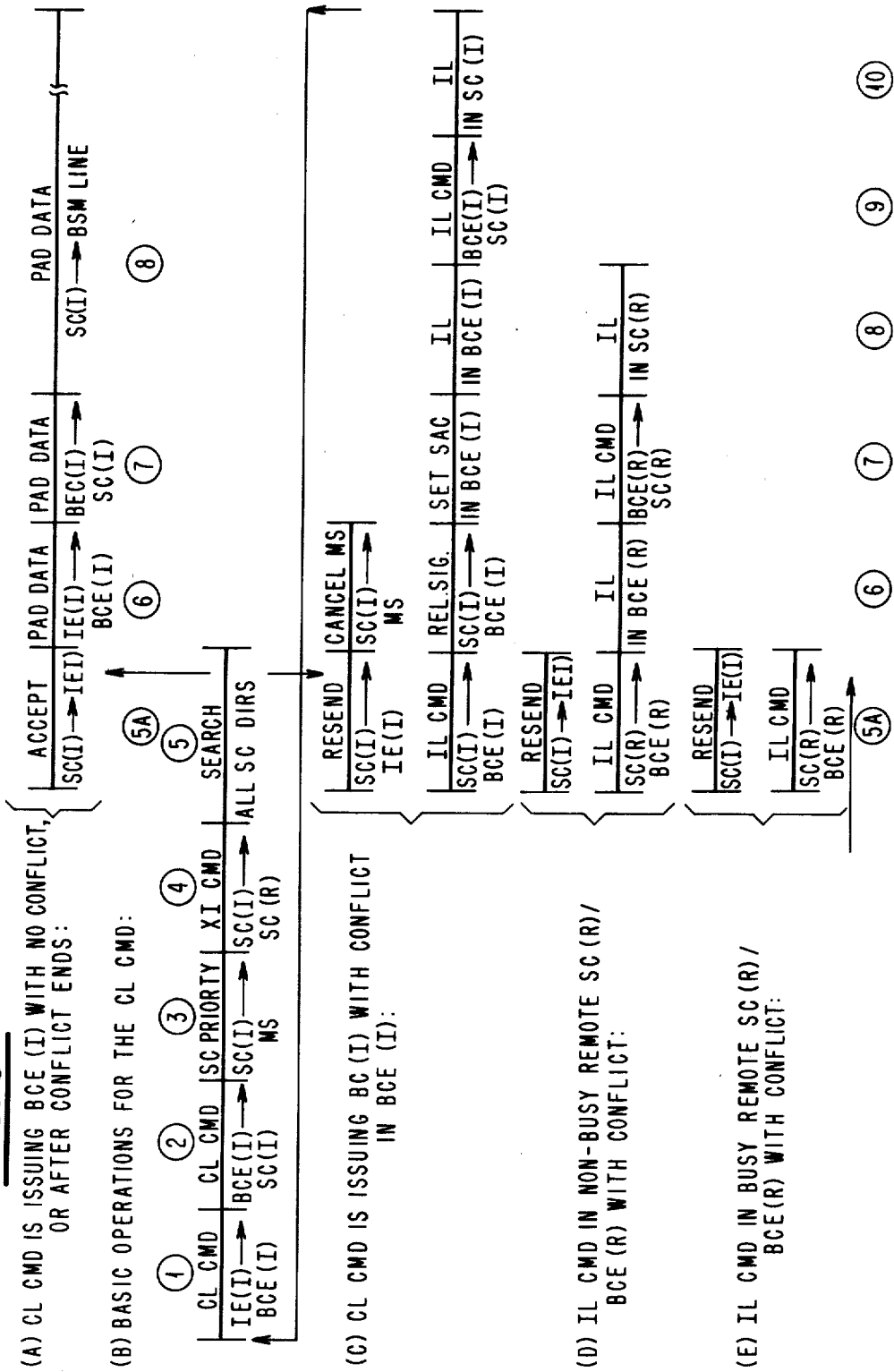

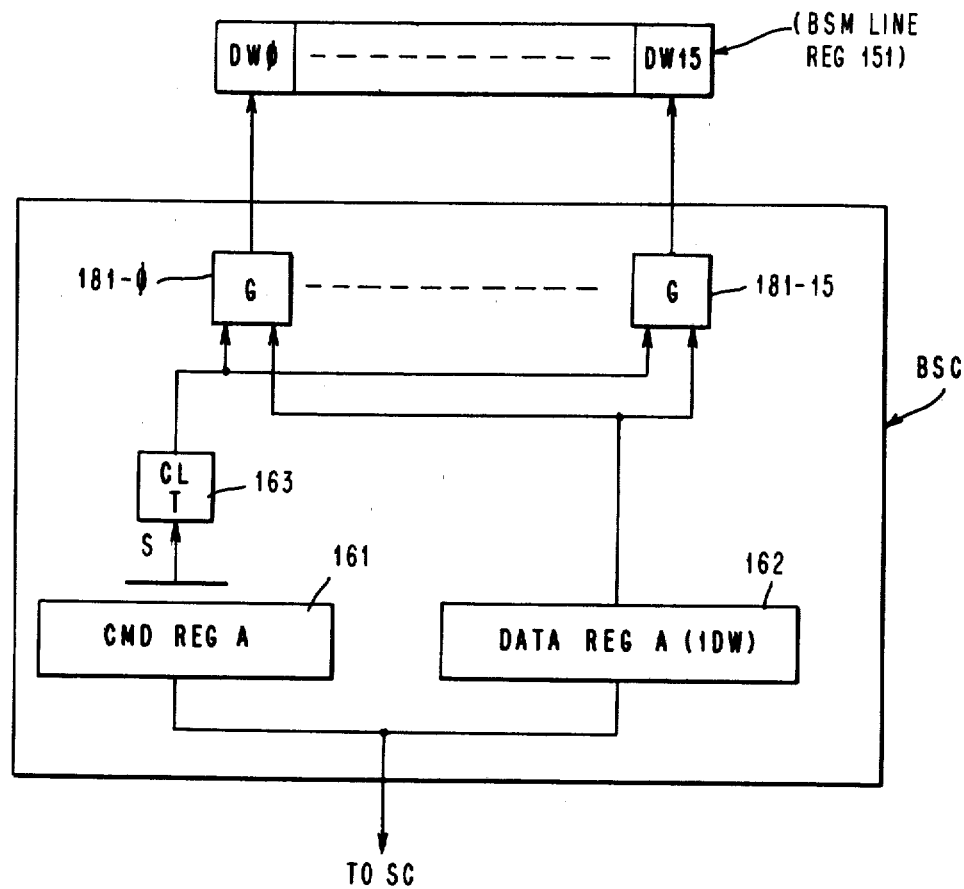
FIG. 10 BSM CONTROLLER (BSC)

STORE-IN-CACHE PROCESSOR MEANS FOR CLEARING MAIN STORAGE

INTRODUCTION

The subject invention relates to improvements in clearing (or repetitively writing of the same character) in the hierarchical storage of a data processing system which is a uniprocessor (UP) or multiprocessor (MP) having each central processing unit (CPU) with a store-in-cache (SIC) and using a system (or storage) control unit to connect the SIC to main storage (MS).

PRIOR ART

The clearing of main storage using a move long (MVCL) instruction has been in public use for many years in IBM System/370 data processing systems using store through (ST) caches.

Recently the store-in-cache (SIC) has been found to provide better system performance than store through (ST) caches in multiprocessor (MP) systems because the SIC has less bandwidth requirements to main storage than the ST. A processor having a SIC does not see main storage when it performs a write operation since the processor writes into the SIC, unlike a ST cache processor which writes directly in main storage. Thus, a processor with a SIC can only indirectly cause writes into main storage when cache misses occur, which are only after the addressed entries in the cache are filled with changed data, or when castout is required by an I/O or another CPU request.

The SIC problem of clearing MS is applicable to uniprocessor (UPs) as well as multiprocessors (MPs). However, MPs have additional cache problems (independent of the type of cache used) occurring when clearing MS shared by plural processors. For example, it is well known that if any processor in a MP clears data in MS, invalidation must be performed on any data in any processor cache in the MP having an address in the cleared MS area. However, it is not well known that the MP may be made inoperable in certain circumstances if any of its processors is permitted to clear an area in MS and make an untimely cache invalidation of data for the cleared area. The reason for this is that a subtle MP architectural rule may be violated, which is that all MS sharing processors must be able to access the same version of MS data. This rule assures that any MP will obtain the same results with the same data. For example, a late cache invalidation may permit a processor to be using uncleared data in its cache when the corresponding data has already been cleared to a different value in MS by another processor (allowing two processors to be operating at the same time on different data from the same MS address, whereby the MP data result of such operation becomes dependent on the time of invalidation which is transparent to the system users), and therefore MP data results become unpredictable.

Early cache invalidation is as bad as late invalidation and likewise may cause unpredictable results. For example, if one processor is to clear an MS area and its first act is to invalidate all processor caches in the MP, any other processor may still be able to fetch a part of the yet uncleared MS area to replace its invalidated data with the yet uncleared data; and such data in the other processor cache would thereafter not be validated, so that the other processor is operating with different data for the MS address which had shortly thereafter been changed in MS by the clearing processor without being again invalidated in the other processor cache.

Accordingly, the changing of an MS area must be synchronized in some adequate fashion with the invalidation of any data for that MS area in all processor SIC caches. This problem is solved in the currently used ST caches in the IBM System/370 M168 or 3033 MPs by the act of storing through the cache directly to MS for each doubleword changed by any processor and invalidating the same line in the cache of the other processor in the MP before the other processor can store its next doubleword into MS.

However, when the processors in an MP use a SIC rather than a ST cache, this invalidation synchronization problem (which is not readily apparent) becomes more difficult, because processor changes to MS data are not directly made in MS but are only made in a processor's SIC. Changed cache data eventually is stored in MS by a SIC whenever the SIC becomes filled and its LRU (least recently used) circuit forces some cache data to be stored into MS to make room for new data in the cache. The result is that the invalidation of correspondingly addressed data in another processor's cache need not be done until some processor or I/O channel provides a store request to the data. Before the store may take place in the requested cache, a broadcast or cross-interrogation must be made to all other caches to search all other caches for the address of the data; and if data at that address is found to be changed in any other cache, it is first put back into MS and fetched into the requested SIC (or directly transferred to the requesting SIC when being put into MS) so that the requesting cache will have the latest version of the data at that address before it performs the processor requested store operation. Therefore only one processor in the MP is permitted to have data which is in the process of being changed; and such data is held exclusively in the cache in which it is to be changed. Nevertheless, plural processors in the MP can be asynchronously fetching the same data in their different caches for read only operations without any cross interrogation or invalidation, as long as they do not attempt to change the data. Therefore, as long as the data is held read-only in the MP caches, no invalidation is required.

Castout controls for an MP system having copy directories and command queues in its system controllers is disclosed and claimed in U.S. Pat. No. 4,136,386 to Annunziata et al.

The exclusive/read-only state of data in a SIC and cross-interrogation between processor cache directories in an MP are disclosed in U.S. Pat. No. 3,735,360 to Anderson et al; U.S. Pat. No. 3,771,137 to Barner et al and U.S. Pat. No. 3,723,976 to Alvarez et al and U.S. Pat. No. 4,056,844 to Izumi. These prior filed patents deal with different inter-processor controls for handling data to be stored in a SIC in an MP. These patents do not deal with the problems existing when a processor (UP or in an MP) having a SIC attempt to clear part or all of MS.

SUMMARY OF THE INVENTION

This invention recognizes that a processor with a store in cache (SIC) performs poorly when used for clearing storage and provides a solution to this problem in both UP or MP systems. A SIC must first fetch data from MS before its processor can store data, for reasons previously discussed requiring the SIC to have the latest version of MS data. Thus, with normal SIC controls, a MS clear operation by a processor (such as by execution of a MVCL instruction) would require the data in the MS area being cleared by a processor first to be fetched into the SIC, cleared in SIC, and only eventually stored back into MS when (1) the space in SIC occupied by the cleared data is required by the LRU circuit for newly fetched data from MS, or (2) in a MP when changed data at the requested MS address is requested by I/O or another processor. It is therefore an object of this invention to more than double the speed at which a UP or MP processor with a SIC can clear MS by eliminating the SIC data fetch and data store operation when the processor is clearing part or all of MS.

It is another object of this invention to improve processor efficiency in executing a clear storage (CS) command by preventing any processor SIC from casting out data which would be stored in an area of MS which is to be cleared by the CS command.

However, an even more serious problem with a processor using a SIC occurs after power is turned on for a system which causes MS to acquire a random bit pattern which may contain bad parity. When thereafter SIC fetches data with bad parity, a machine check error can occur to prevent a further SIC operation with the data. Therefore, main storage parity must be validated after power turn-on before SIC operation may be started. This is done by this invention providing means for a SIC oriented processor to write valid data into a part or all of MS without first having to fetch data into SIC, which would otherwise occur. It is therefore another object of this invention to permit MS parity (including ECC parity) to be validated in UP and MP systems using SIC.

Since studies have shown that a substantial amount of system time is used for clearing MS, it is a further object of this invention to significantly improve the cost/performance of any system using SIC.

When any processor in an MP executes a clear storage (CS) command, controls are provided to synchronize directory search operations in all processors. The synchronization is initiated by a cross-interrogation (i.e. broadcast) signal to directories for all processor SICs in the MP from any processor which issues a CS command. To reduce cache interference due to cross-interrogation, a copy of each processor cache directory is maintained by the storage control for purposes of cross-interrogation (XI), so that all XI requests are made to and processed by the copy directories rather than by the processor cache directories. Then the only time that any processor cache directory is interfered with for purposes of cross-interrogation is when its copy directory finds that the processor directory contains data to be invalidated, i.e. finds a XI conflict exists. Only a small percentage of XI requests among copy directories will find XI conflicts, so that the processor cache directories are not bothered by most XI requests.

With this invention, the CS command from a processor is inhibited from going to the processor cache directory, as would normally occur for other processor storage requests. Therefore, the CS command execution is not delayed when the processor cache directory is in use by a prior request. Also, the CS command need not immediately invalidate any conflicting line in the issuing processor cache directory before the directories for other processors can be searched. But the processor cache controls immediately transfer the CS command to controls for its copy directory, which then sends a request to MS to clear the data from MS, and sends a XI request to all other copy directories in the MP system to initiate a synchronized search of all copy directories in order to determine if any XI conflict exists. If any conflict is found in any copy directory in the MP, the processor which issued the CS command is signalled to reissue the CS command in order to properly time the execution of the CS command in relation to all conflicting processors.

If a conflict is found in any one or more of the copy directories, in the MP, the controls for each conflicting copy directory: send an invalidate request to its respective processor cache directory to request the invalidation of the conflicting data in the processor directory. Then the controls for the copy directory for the issuing processor sends a resend command to its respective processor cache directory. The invalidation request to any processor cache is accepted when its cache priority circuit determines the processor cache directory is available to perform the invalidation request, i.e. it is non-busy and the invalidation request is its highest priority outstanding request. For example, a processor cache may be busy awaiting the translation of a prior processor request and not be able to immediately accept an invalidation request.

If any conflict is signalled to the copy directory controls for the issuing processor, the controls also send a resend command to the processor instruction execution (IE) unit to prevent the processor from issuing its next command by causing the processor to reissue the CS command, which starts a next iteration of an invalidation looping operation, in which the CS command is re-executed in the same manner and again causes a cross-interrogation to and search of all copy directories. As long as any copy directory in the MP finds a conflict during an iteration, it sends a conflict signal to all copy directory controls, and the conflict signal is used by the issuing copy directory controls to again issue the resend signal to its IE unit, which again reissues the CS command. In this manner the looping operation continues the execution of the CS command in the issuing processor. During each loop, an invalidate request is generated from each conflicting copy directory to its processor copy directory, i.e. having a cache with data to be cleared which has not yet been invalidated. The loop iteration in which the last cache in the MP has invalidated its conflicting data is followed by the last iteration of the loop in the issuing processor, which recognizes that no conflict then exists in the MP; and its copy directory controls send an accept signal to the issuing IE unit (instead of a resend signal), which then stops reissuing the CS command to end the looping, and no MS cancel signal is sent to MS. The clearing operation then takes place in MS, and the execution of the CS command is completed for all caches in the MP.

A copy directory invalidation request need not be accepted by a processor's cache directory, in which case the request does not cause an invalidation of the conflicting data in its processor cache directory. That is, a processor's cache priority circuit may not accept its copy directory's invalidation request during an interation of the loop, which continues the MP conflict into the next loop iteration when it will again be detected by the synchronized directory search, and the issuing processor will reissue the resend command to cause the looping to continue until no conflict exists in the MP. The continuation of the invalidation looping is dependent upon not invalidating the conflicting data in the copy directory until after the invalidation is done in its processor cache directory. Therefore, the conflict remains detectable in the copy directory during the search in the next loop iteration, which is essential for continuing the loop iterations as long as the data is not invalidated in the processor cache directory. In this manner, all conflicting processors are synchronized by the looping so that no processor which has conflicting data is permitted to store the data in the MS area to be cleared.

The conventional unit of data transferred between the cache and MS is called a line (or block), which comprises a fixed number of contiguous bits in MS which are addressed as a unit in the cache directory. A line may be comprised of N transfer units, in which a transfer unit is one parallel transfer of data on the bus between MS and the cache. For example, a line may comprise sixteen doublewords (DWs) which may be transferred a DW at a time in sixteen sequential transfers to the cache on a MS but which is one DW wide.

When an area in MS is to be cleared under program control (e.g. MVCL instruction), the area may be less than, equal to, or greater than a cache line. The number of lines in the area to be cleared is determined by the instruction execution (IE) unit in a processor executing a clear storage instruction. In the preferred embodiment of this invention, the IE generates a special command called a clear line (CL) command, which is a specific form of the more general CS command previously discussed herein. The IE will issue one CL command for each line to be cleared in MS. The procedure used for the CL command is as previously described for the CS command. Thus, the CL command is provided by the IE to the processor cache directory controls (BCE) with the address of the line to be cleared. The BCE inhibits a search of the processor cache directory but sends the CL command to the associated copy directory controls. The receiving copy discovery controls generate and send a XI search request to every copy directory in an MP system. A synchronized search results in all copy directories in the MP, even though the processors in the MP are asynchronous with each other. The XI synchronization is obtained by respective priority circuits in the respective copy directory controls which give high priority to an XI request. Because of the synchronization, if a conflicting line address is found in any copy directory, its conflict signal is provided to the issuing processor during the synchronized search, in order to continue execution of the CL command in the issuing processor in relation to every conflicting processor in the MP, and to prevent the clearing of the line in MS until the address of the line to be cleared is invalidated in every cache in the MP.

Any non-issuing processor performing the synchronized search without finding the conflicting line in its cache is thereafter free to use its cache. But if any processor without a conflict should make a fetch of the conflicting line before completion of the execution of the CL command by the issuing processor (and therefore before the line is cleared in MS), the newly conflicting line will be detected by the search during the next loop of the CL command and will be invalidated before the concurrent CL command completes its execution.

In this manner, the cache invalidation procedure occurs in a way which prevents architectural violation of the consistent results rule in an MP. That is, all processors are inhibited from effectively accessing a line being cleared in MS when accessing their SICs during the execution of a CL command. The copy directory search synchronization and the looping reissuance of the XI requests assure all processors in the MP that none of them can cause any line invalidation in their SIC either too late or too early in relation to the time the line is actually cleared in MS, so that all processors are assured that their program execution results will not be made inconsistent by improper timing among the line invalidation in the different caches and the clearing of the line in MS. The CL cache search synchronizations effectively prevent the asynchronous processors from processing a line being cleared in MS until all processors in the MP invalidate the conflicting line from their caches. If any processor has a concurrent request for a copy directory search, the CL XI search for any conflicting line will obtain priority over and thereby preceed the copy directory search for the concurrent processor request in order to obtain substantial synchronization for all XI directory searches.

A fundamental problem exists in the validation of the main storage ECC, even though it requires the simple act of setting all byte positions in MS to a particular byte value, i.e. a pad byte, such as zero, blank, 5 F in hexadecimal, etc. This can be done by a sequence of CL commands executed with addresses which cover all MS locations such as by a MVCL instruction in the manner previously described.

A problem occurs in regard to the source of the instruction controlling the sequence of CL commands. If the MVCL instruction is obtained as a normal data processing instruction, it must have previously been stored into MS before it can be fetched from MS for execution by the IE unit. The problem is caused by not being able to validate MS ECC before storing the MVCL instruction, which requires the fetching of an I/O channel program from MS in an area in MS which has not yet been validated with the inherent risk of machine checks on such fetching. Even the act of storing a channel program may use partial stores which involve fetches in non-validated MS into which the MVCL instruction is to be stored.

The MS validation problem is solved by this invention providing a special feature in the CPU which permits the CL command to be executed without any access to MS. This special feature is under the control of another processor in the system, e.g. a service processor (SVP) which can actuate the CPU to execute a special form of the CL command which does not require any prior access to MS and which controls a sequence of CL commands that have addresses which cover every location in MS. The SVP can thereby cause a sequence of CL commands to execute which write a selected character all through MS. The SVP may then use the result of the CL command sequence to test MS by fetching the pad character from MS and comparing it to the expected pad character to test the ECC validity of MS and delineate its bad areas, resulting in a validated MS with bad areas excluded from use by the CPU when it performs normal processing. Such MS testing process preferably involves having the SVP repeat this testing of MS several times, each time causing the special CL feature to write a different pad byte followed by fetches and comparisons, in order to thoroughly exercise the bit cells in MS to detect all possible types of failures. (See U.S. Pat. No. 4,342,084 filed Nov. 11, 1980, entitled "Main Storage Validation Means" by G. S. Sager and A. J. Sutton and assigned to the same assignee of this application for a detailed discussion on storage validation by using a special hardware tester provided within MS.)

BRIEF DESCRIPTION OF THE DRAWINGS

FIGS. 2A, 2B, 2C and 2D illustrate the types of information found in various commands used in the described embodiment of the invention.

FIG. 3 illustrates diagramatically the overlapping storage hierarchies found in a multiprocessing (MP) system having processor exclusive caches and a shared main storage (MS).

FIG. 4 illustrates controls found in the instruction execution (IE) of any one of the central processors (CPs) shown in FIG. 1 of which CP0 is used as the exemplary processor.

FIG. 5 illustrates the processor cache controls (BCE) found in each central processor.

FIGS. 6A and 6B illustrate the pertinent controls found in each system controller (SC) shown in FIG. 1.

FIG. 7 illustrates in block form the data path found in the system controller and a BSM controller (BSC) in the data processing system.

FIGS. 9A, 9B, 9C, 9D and 9E represent timing diagrams showing the sequencing of operations in the described embodiment.

FIG. 10 shows another BSM controller (BSC) arrangement which provides a faster clear line operation than in FIG. 7.

DESCRIPTION OF THE PREFERRED EMBODIMENT

Figure 1:
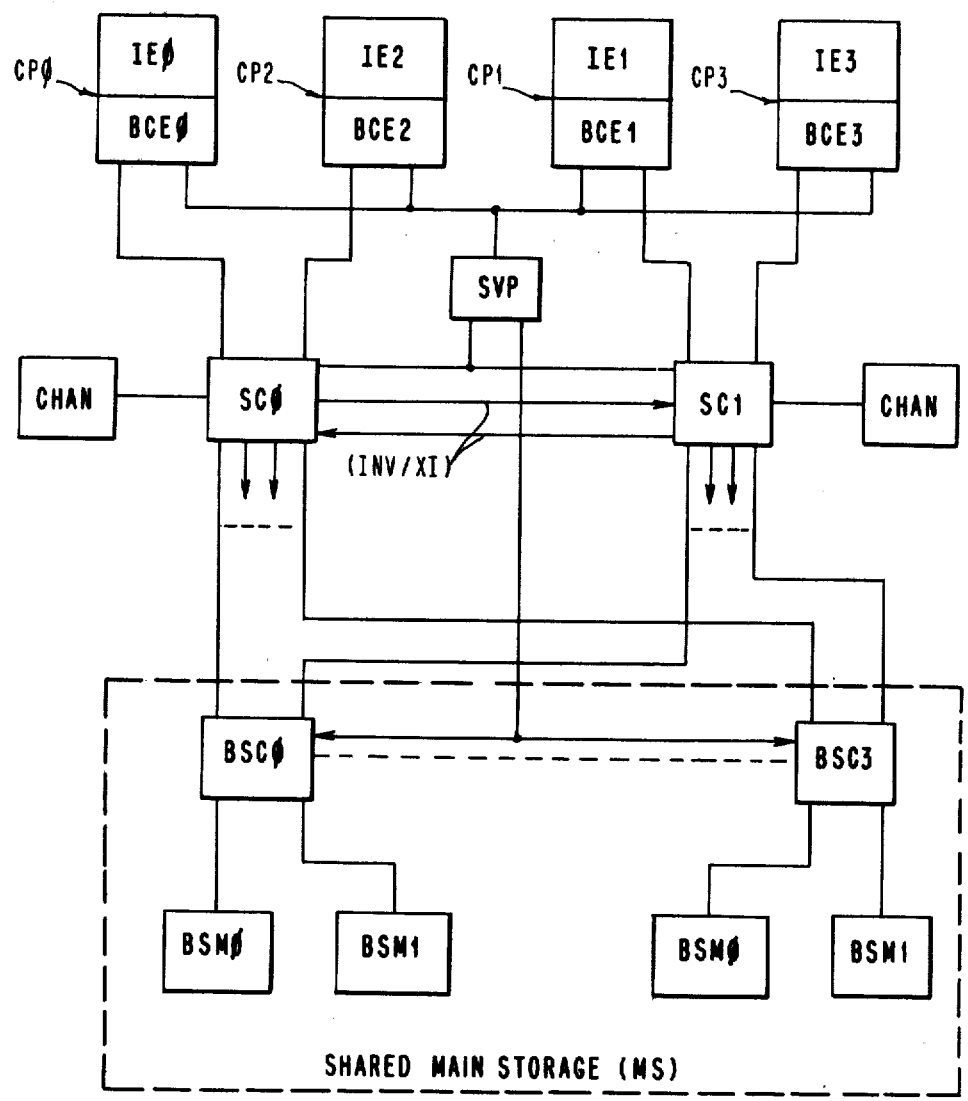
FIG. 1 is a block diagram of a multiprocessing system utilizing the subject invention.

The multiprocessor (MP) illustrated in FIG. 1 comprises four central processors CP0 through CP3, in which each CP includes an instruction execution (IE) unit and a buffer control unit (BCE). The IE includes the hardware which issues a clear storage (CS) command which in this particular embodiment is more specifically called a clear line (CL) command because it controls the clearing of one line in MS. The IE issues the CL command to its BCE. The BCE includes a processor store-in cache (SIC) with its associated processor cache directory and associated processor cache controls which are exclusively used by the associated CP.

This invention solves an MP integrity problem in the clearing of shared main storage by requiring that the unit of invalidation in the caches must not be less than the unit of area being cleared concurrently in shared main storage. In this embodiment, the cache line is the unit which is cleared in MS in any single operation and the unit which is invalidated in any cache in which a conflict occurs.

Two system coontrollers SC0 and SC1 each connect to two CPs and to the shared main storage (MS), so that either connected processor can access any shared area in main storage. Each SC also connects I/O to the shared main storage. Each SC may include the subject matter disclosed in U.S. Pat. No. 4,280,176 filed: Dec. 26, 1978 by K. G. Tan entitled "Memory Configuration, Address Interleaving, Relocation and Access Control System" and U.S. Pat. No. 4,293,910 filed: July 2, 1979 by F. O. Flusche et al. entitled "Reconfigurable Key-In-Storage Means for Protecting Interleaved Main Storage."

The shared main storage comprises of a plurality of BSM controllers BSC0 through BSC3 in which each BSC connects to two BSMs 0 and 1. The four BSCs 0-3 are each connected to each SC.

An invalidate cross-interrogate (INV/XI) bus connects from each SC to the other SC. The INV/XI bus communicates all cross-interrogation (XI) requests and all castout (CO) and invalidate (INV) signals between the SCs in order to coordinate the required castouts and invalidations in the directories.

Each SC contains a pair of copy directories. Each copy directory contains an image of the contents of a corresponding processor cache directory in one of the BCE's connected to the respective SC.

FIG. 3 illustrates the storage hierarchies I through IV found between the respective CPs and the shared main storage. Thus, each CP interfaces the apex of a hierarchy comprising the BCE cache found with the respective CP. Each BCE interfaces its corresponding copy directory. The base of the hierarchy is the shared MS with which each CP communicates. The data transfer between each CP and the shared MS is performed a line at a time, in which each request from the BCE to the shared main storage is for a line of data or instructions in MS when a CPU request is not available in the BCE cache or the BCE cache does not have the latest changed version of the requested data.

The copy directories handle all cross-interrogation (XI) requests so that the processor cache directories in the BCEs will not need to handle the XI interrogation requests and can thereby better service their respective CPs. CO/INV busses communicate both invalidate and cast-out requests from other CPs so that conflicts between the CPs may be avoided when accessing shared main storage.

FIG. 4 illustrates the instruction execution (IE) unit in CP0 in regard to the issuance of a clear line (CL) command by CP0. Each of the other CPs 1-3 has a IE identical the the IE0. The described IE unit is basically similar to IE units in microprogrammed processors having a microinstruction control store containing microprograms. A unique microinstruction (designated the clear line microword) is provided in control store 13 for initiating the clearing of a single line in the shared main storage. The clear line (CL) microword is issued via the microinstruction select and decode unit 14.

Two different ways of controlling the issuance of the CL microword are represented in FIG. 4. One way accommodates the MS validation problem previously discussed herein. The other way accommodates normal program usage of the CL command for clearing a designated area in MS. A signal from a system service processor (SVP), usually associated with a system console, is provided on lines 5 in FIG. 4 to microinstruction select and decode unit 14 to cause unit 14 to address and initiate execution of a special SVP CL microinstruction sequence in control store 13. No access to MS is involved in the initiation and execution of this special SVP CL microprogram in CP0. This microprogram issues and executes a CL command for every line address in MS in order to validate all of MS without any fetching of data from MS, and without any access to the SIC in CP0, which is inhibited by a gate 59 in FIG. 5. The special SVP CL microprogram is shown in control store 13 beginning with the SVP CL microword and ending with the SVP END OP microword. A microword in this microprogram loads a pad byte into the IE data register 17, and other microwords increment the line address in operand address register 16 to every line address in MS.

On the other hand, the invention also provides for the CL command to be issued under normal program instruction control by any instruction which can clear or otherwise propagate a pad character over an area in MS. A second CL microprogrm is represented in control store 13 for use by instructions in programs being executed by CP0. The second CL microprogram is shown in control store 13 beginning with the INST CL microword and ending with the INST END OP microword. The INST CL microword and the SVP CL microword may be identical except for the control store address they define for selecting the next microword in their respective microprogram. An example of a normal program instruction which may issue the CL microword is the move long (MVCL) instruction which is found in the instruction set for the IBM System/370 model machines. The MVCL instruction involves the use of four general registers (GRs) which are found in a local store 12 and which are selected under GR select addressing control 19. The operation of the move long instruction is described in the IBM System/370 Principles of Operation (Form Number GA22-7000). The MVCL instruction can propagate a pad byte in its source operand into its sink operand, and the sink operand may have a variable length up to 16,777,215 bytes. The source operand address is found in general register R2, and the length of the source operand is found in general register R2+1 bit positions 8–3. When the source operand address in general register R2+1 is zero, the pad byte found in bit positions 0–7 of register R2+1 is moved into the sink operand in each byte position up to the end of the source length defined in register R1+1. General registers R1 and R2 are even-numbered registers and R1+1 and R2+1 are odd-numbered registers in local store 12. Exemplary hardware shown in FIG. 4 determines the number of lines of the pad character to be stored in MS during the execution of a MVCL instruction, the MS address of each line for which the IE unit issues a clear line command, and the number of lines remaining to be moved to the sink area in order to keep track of how many consecutive clear line commands should be issued.

The line size is set by a microword that stores a line size constant into the content of line size constant register 35, which for example may be 128 bytes representing 16 double words. A current line address register 32 initially receives the R1 address from local store 12 via gate 31 under control of micro-instruction select and decoder unit 14, and provides the MS address in each CL command while executing the MVCL instruction. Register 32 is updated with the address for each next CL command by an adder 33 which receives the current line address in register 32, and adds to it the line size constant received from register 35 via a gate 36 each time a command accept trigger 42 receives a command accept signal from SC0. The updated output of adder 33 is loaded into register 32 to fom the next CL command address. A line counter 38 maintains a count of the number of lines remaining in the execution of the MVCL instruction. The initial value in counter 38 is provided by a divider 37 which divides the sink area length gated from R1+1 by the line size constant from register 35 to determine the initial number of lines to be stored in the sink operand of the MVCL instruction. Line counter 38 is decremented by 1 from line 44 each time a CL command is executed, which is signalled by an output from a command accept trigger 42. When the output of the decrementing line counter reaches zero, it signals microinstruction select and decoder 14 to indicate when the execution of the MVCL instruction is completed.

The pad character in MVCL register R2+1 is provided from local store 12 into an IE data register 17 and is replicated throughout the byte positions of doubleword register 17 under control of decoder 14. Operand address register 16 receives the initial line address from register R1, and thereafter receives the line address from adder 33 so that register 16 reflects the main storage address of the current line which is the subject of the current CL command. A PSW key register 11 enables the CL command to determine that there is no protection violation when it accesses a line in MS.

Upon the completion or termination of each CL command issued by the IE, a successful action completed (SAC) signal is received from its BCE. The SAC signal causes the IE to issue the next command, which may be a reissue of the same command when circumstances require. When command accept trigger 42 is set, the IE issues the next command, and when command resend trigger 41 is set, the IE reissues the same command. A CL command may be reissued several times before it is finally completed. The accept or resend signals are received from SC circuits in FIG. 6B to set triggers 42 or 41, and to pass through an OR circuit 45 to condition an AND gate 46 which is then enabled by a timely SAC signal to permit register 16 either to again ingate the same MS line address, or to ingate the next line address, depending on gate 36 being activated by command accept trigger 42. Also a command trigger 47 is set by the SAC signal to also control the ingating into register 16. Each time a CL command is issued or reissued, its decoder unit 14 activates its command request line 25 to signal the BCE that another command is available for BCE execution.

The pertinent details in BCE0 are illustrated in FIG. 5 and are representative of the other BCEs 1–3 in the MP system. BCE0 contains a processor store-in cache (SIC) 63 which is the high speed storage buffer for CP0. All CP0 storage requests are provided to BCE0 which determines whether the requested data is currently in SIC 63.

The IE0 is capable of providing all processor commands. Most of the issued commands are storage access commands, but there are also special access commands which operate differently from commands that normally access storage, such as the CL command. A normal storage access command will have its address immediately provided by the BCE to its SIC directory 62 to determine if requested data is available in SIC 63. However, when the BCE receives a CL command, it does not search its SIC directory 62, but instead inhibits a search of SIC directory 62 by activating a CL address inibit gate 59 by means of an output from a CL trigger 58 in command controls, which include a decoder 57 that receives all commands on line 26 from microinstruction select decoder 14 in FIG. 4.

The CL command is one of up to 256 commands which may be decoded. When a command is decoded, a particular output from decoder 57 sets CL trigger 58. Whenever the IE outputs a command, it activates a line 25 if it is a special command request (such as for a CL command), or activates a line 27 if it is a normal storage request. Lines 25 and 27 are provided as request inputs to a BCE priority circuit 28 which determines which of contending requests will be accepted for execution of the BCE during the current machine cycle. Other request inputs (not shown) internal to the BCE are provided which are not pertinent to this invention.

The output of priority circuit 28 is also provided on a line 29 to set a command request trigger 56 to indicate a request to a PIR priority circuit 129 in FIG. 6A that a command will be available from register 55 in BCE0 during the next machine cycle. A similar command being formulated in the BCE2 of CP2 would set the CP2 identifier bit on in the command. Hence, the SC can use the CP ID field in the command to recognize which CP issued the command.

Although IE issues a clear line command, it is inhibited from reaching SIC directory 62 and it is provided to a command data (CMD/DATA) register 55 in the exemplary format illustrated in FIG. 2A which component parts are gated into register 55 by the set of gates which reference FIG. 2A wherein the four gates respectively receive the four information components shown in FIG. 2A. Thus, the four information component, PSW key, is gated on lines 21. The absolute address of the line to be cleared is outputted from a register 53 which receives the output from an address translation and prefixing controls 52 having the dynamic address translation (DAT) circuitry 52A and a dynamic look-aside address translation (DLAT) array 52B. Controls 52 receive the logical address provided by the IE to BCE address register 51 on lines 22 provided from operand address register 16 in FIG. 4. The formulated command is gated out of register 55 on bus 69 to processor input register (PIR) 87 found in FIG. 6A.

A BCE0 command is provided from bus 69 through gate 70 to PIR 87 when permitted by a PIR priority circuit 129 which determines which command will be received by PIR 87 when BCE0 and BCE2 are simultaneously providing commands. Circuit 129 may provide alternating priority, or it may be a circuit such as described and claimed in U.S. Pat. No. 4,152,764. If no contention exists, a command is immediately accepted into PIR 87. Then the command is provided into the cross-interrogate register (XIR) 91 from which it is used to search all copy directories in the MP system. For searching the local copy directories, it is transferred into a directory register 131. For searching remote copy directories, XIR 91 is simultaneously transferred on line 44 to the XI bus from which it is received by the remote SC and put into its directory register 131, when it gets priority from the XIR priority circuits 130 in all SCs.

Therefore, PIR 87 also has an input from BCE 2 provided to gate 71, in order to receive commands from CP2 under the control of priority circuit 129.

Whenever a command received into PIR 87 has a one bit in a CL bit position of a command, it will activate a gate 89 to pass the command from PIR 87 to a storage input register (SIR) 90, from which is put on a main storage bus 141 as a request to main storage.

Before any command can pass from either the local or remote XIR 91, it must obtain priority from an XIR priority circuit 130 in every SC. Circuit 130 determines the priority of contention for searches in all SC copy directories, of which the local copy directories are shown in FIG. 6B as directories 116 and 117. Similar copy directories exist in each remote SC. The requesting inputs to circuits 130 are the inverted output from a local busy trigger 134, the local cross-interrogate (XI) signal from an operation decoder 88 when it determines the command operation code in PIR 87 requires a directory search conflict determination, and a remote SC busy signal, a remote XIR request signal from the INV/XI bus. Also the XIR priority circuit 130 in each SC synchronizes its searches with the XIR priority circuit in each other SC via signals between them on a XI search synchronization bus 130A.

The output of priority circuit 130 determines whether a local command in XIR 91 or a remote command from the remote XIR register is permitted to input into directory register 31 via gate 132 or 133, respectively. The priorities in circuit 130 and signals on bus 130A are such as to cause the same request to be searched simultaneously in all local and remote SC copy directories. The synchronization is aided by the priority selection in circuit 130 in which the local and remote SC busy lines inhibit a search for a respective command if the SC is busy during that machine cycle.

| PRIORITIES OF SEARCHERS IN LOCAL SC | | | | |
|---|---|---|---|---|
| Local Cmd | Local Busy | Remote Cmd | Remote Busy | Simultaneous Search In Local Directories |
| No | No | Yes | No | Search Remote Cmd |
| Yes | No | No | No | Search Local Cmd |
| Yes | No | Yes | No | Search SC0 then SC1 Cmds Alternately |
| No | X | No | X | Wait |
| X | Yes | X | X | Wait |
| X | X | X | Yes | Wait |

X = Don't care if yes or no

If any command is selected, one of the two output lines from circuit 130 activates either gate 132 or 133 to select the local or remote XIR command address for searching in all copy directories. The two output lines are received by an OR circuit 130B, which provides an output that sets the local busy trigger 134 to indicate all copy directories in the system are busy. A timeout circuit 129A also is activated by the set signal; and after a time period equal to the search time for all directories, it output a reset signal to trigger 134, putting it in its non-busy state. The non-busy signal from trigger 134 on line 134A resets the directory conflict triggers 124 and 134 in FIG. 6B.

The execution of a storage command also includes the key checking needed to assure that there is no main storage protection violation (SPV) by a CL command. This is done by providing a remote SC command's address and key on XIR line 144 to a local SC storage protection array and controls 92 to select the protect key for the storage block being accessed and compare it to the PSW key in the current command. Likewise, a remote XIR command's address and key is provided on line 143 to controls 92 to protection check a remote request. The storage protect controls 92 may be constructed as described in prior filed U.S. application Ser. No. 054,350 (previously cited) in order to determine if a storage protect violation (SPV) exists, and then providing a signal which sets a SPV trigger 96 that provides a SPV signal on line 75 to BCE0 and also to FIG. 6B in the SC. A storage protect violation actuates release controls 93 to end the execution for the command causing the violation by setting a release trigger 94 and a status register 95.

When a CL command is accepted by priority circuit 130, it is transferred into directory register 131, from which it outputs the CL address on lines 131A and a CL command signal on line 131B to FIG. 6B. The CL address is received by directory address register 114 which simultaneously searches both copy directories 116 and 117. Address decoder 114 decodes the class address in both directories and transmits the set selection bits to comparators 118 and 119 at the outputs of the directories to determine whether the requested address in each directory in the manner conventional for set associative directories. If the CL address on line 131A is found in either directory, its comparator output sets an associated directory conflict trigger 124 and an invalidation request trigger 123 for CP0, or conflict trigger 134 and invalidation request trigger 137A for CP2. The setting of either conflict trigger 124 or 136 in the SC causes a conflict output signal on line 137A from OR circuit 137 which is transmitted to the remote SC from FIG. 6A.

An MP conflict is detected by an OR circuit 138, which receives the outputs of both conflict triggers 124 and 136 in the local SC and also receives any conflict request on line 137B of the XI bus from the remote SC which is provided by a remote corresponding OR circuit 137. Accordingly, an output from OR circuit 138 indicates whether any cache conflict exists in the multiprocessing system.

The MP conflict signal from OR circuit 138 is provided to a circuit 142 which generates a resend or accept signal which is sent to the CP which issued the current command. The CP ID field in XIR 91 signals which CP issued the current command in XIR 91. Circuit 142 includes a command resend trigger and a command accept trigger. The command resend trigger is set for one cycle if the CL command cannot be immediately completed. The circuit 142 is conditioned by the existence of a CL command signal which is provided to its AND gates 98, 99 and 106. The accept trigger 104 is set if the CL command is about to be completed which occurs when no MP conflict exists, which occurs when AND gate 106 is activated by the output of inverter 125 to provide a signal through OR circuit 103 that sets the command accept trigger. If a MP conflict does exist, AND gate 99 is activated by the output of OR circuit 138 and by the CL command signal as long as there is no storage protect violation (which is indicated by the output of inverter 97). If a storage protect violation does occur, then the command is immediately ended by the SPV signal on line 75 activating AND gate 98 which sets the accept trigger 104 to complete the execution of the CL command during an MP conflict when the storage protect violation exists.

When invalidation request trigger 123 is set, an invalidation command is formulated in a register 120 for CP0. Likewise, if SC copy directory 2 sets invalidation request trigger 135, an invalidation register 121 formulates an invalidation command for CP2. The information in the invalidation command is illustrated in FIG. 2C and it is transmitted from the SC to the respective BCE having a conflict in its SIC directory (castout fields in this SC to BCE command are not pertinent to this invention and are not described in detail). The content of register 120 therefore includes the directory class address obtained from the output of DAR 114, while that set address is obtained from the output of comparator 118, the clear line bit is set from line 131B, while the castout bit is obtained from the respective CPs C0 controls. The invalidate request is not in register 120 but is provided on line 71 from the output of invalidation request trigger 123.

Invalidation register 121 has its command formulated in the same manner as in register 120, except that register 121 formulates its command only from CP2 information.

The invalidation command is sent from the SC to the respective BCE register 65 and trigger 66 in FIG. 5. When set, the invalidation request trigger 66 activates the output from register 65 to the cache castout and invalidate controls 64, in order to specify a search of the BCE0 SIC directory 62 for the address having the class and set indicated in register 65.

The output of invalidation request trigger 66 simultaneously provides a signal to BCE priority circuit 28 to request the search of the SIC directory, since it is possible for simultaneous search requests to exist from other sources. When priority is signalled on line 29, controls 64 cause the search to immediately occur. When the search finds the required entry in the SIC directory, the signal from trigger 66 causes the valid bit in the found entry to be set to its invalid state to invalidate the corresponding line in SIC 63.

Figure 8:
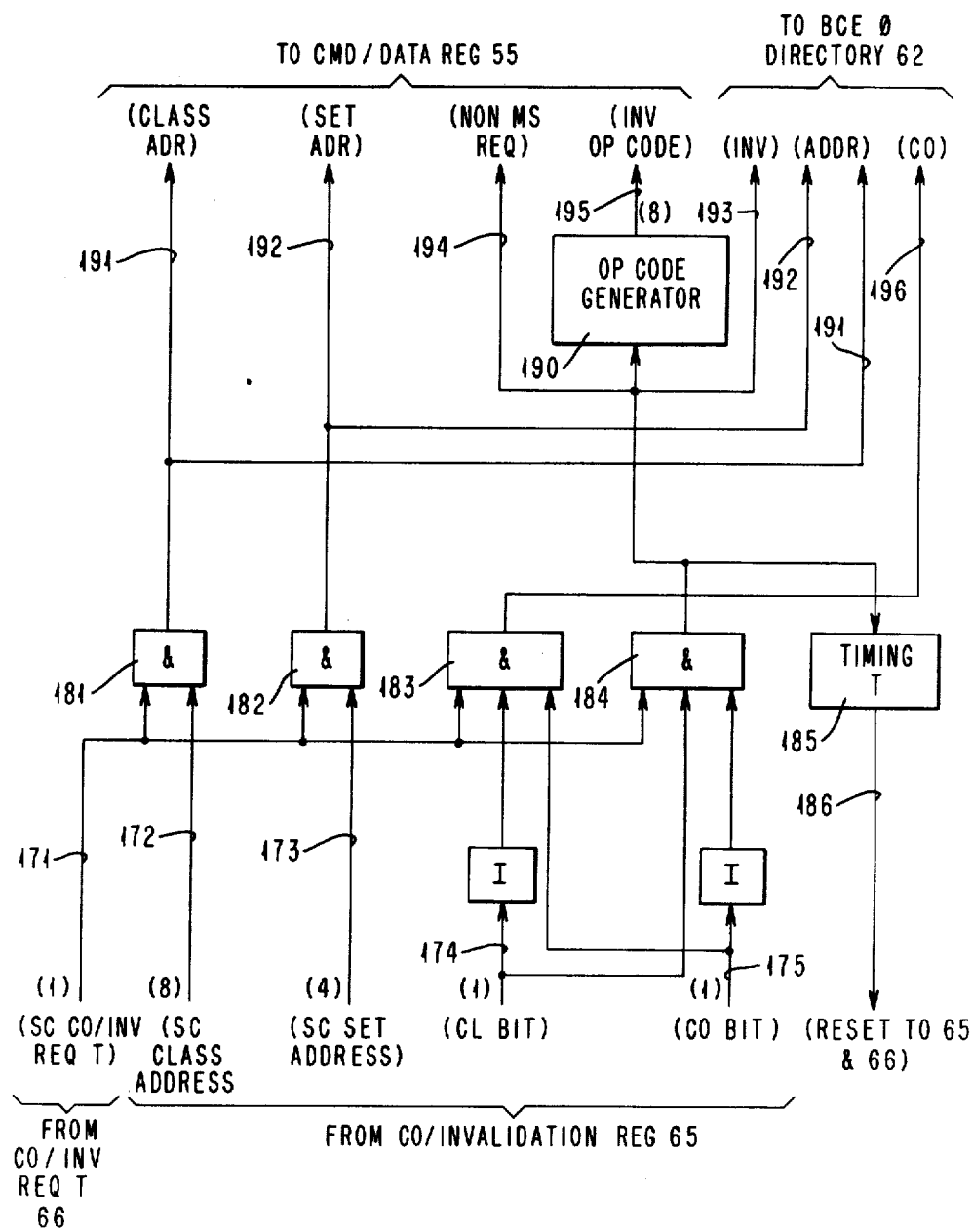
FIG. 8 shows in detail the cache cast-out and invalidate controls 64 represented as a block in FIG. 5.

FIG. 8 illustrates in detail the internals of the cache castout and invalidate control 64 in FIG. 5. The format of the input signals to FIG. 8 is shown in FIG. 2C for the SC invalidate command. Invalidate control 64 simultaneously provides signals to the BCE directory to locate and invalidate the conflicting entry and provides signals to the command/data register 65 to formulate an invalidate command therein (shown in FIG. 2D) for transmission to the SC to invalidate the corresponding entry in the associated copy directory, after the entry is invalidated in the associated BCE directory. Thus, in FIG. 5, the request trigger 66 is set by an invalidation signal on line 71 (or by a castout signal (not shown) on a line 71A, because this invention is not concerned with the cast-out function. The output of invalidation trigger 66 is provided to FIG. 8 to condition each of the AND gates 181, 182, 183 and 184. AND gates 181 and 182 pass the class and set address of the required entry to register 55 and to BCE0 directory 62 on lines 191 and 192. Gate 183 outputs any castout signal to directory 62 when in the SC invalidate command, there is no CL bit set but the castout bit is set. AND gate 184 provides the invalidating signal to directory 62 on line 193 when activated by the set CL bit signal on line 174 and the invalidate signal on line 171, but with the castout bit signal off on line 175. The output of AND gate 184 also controls the signal on line 194 which indicates a non-main-store request and OP code signals on the eight lines 195 when generator 190 is activated by the output of AND gate 184 to control the SC operation for invalidating the corresponding entry in the associated copy directory. A timing trigger 185 is also actuated by the output of AND gate 184 to provide a signal on line 186 that resets invalidation register 65 and invalidation trigger 66.

Furthermore in FIG. 6B, the set output of the conflict triggers 124 or 134, or a remote SC conflict signal, passes through an OR circuit 138 to set a cancellation trigger 108 which then provides a cancel request for the main storage command in the MS queue previously issued as a result of the clear line command. Also a release signal is provided on line 68 from the SC to the SAC trigger 81 in FIG. 5 via an AND gate 78 conditioned by the CL trigger 58. At the same time, status register 95 in FIG. 5 is set with a code indicating the conditions for the completion of the command. Lines 74 transmit the status information to a BCE status register and decoder 76 in FIG. 5 to inform the BCE of current SC conditions, e.g. that the requested invalidation has been performed.

The release controls 93 are actuated by a signal from an OR circuit 140 in FIG. 6A which receives a line 139A from AND gate 139 in FIG. 6B. A signal is provided from OR circuit 138 and when no storage protect violation signal is provided from inverter 97.

FIGS. 9A through 9E illustrate the sequence of operations that occur with the hardware illustrated in FIGS. 4, 5, 6A and 6B. In FIG. 9, IE(I) represents the BCE with the CPU issuing the CL command. BCE(R) represents a remote BCE which finds a conflict in its cache directory, but BCE(R) did not issue the CL command having the conflict. In FIGS. 9A through 9E the numerals in circles represent the time sequence of operations, in which the operation is indicated by the word(s) above a horizontal line and between adjacent vertical lines, and the statement below the horizontal line represents the transfer or location of the indicated operation.

FIG. 9B represents the basic sequence of operations which occur from the initial issuance and from each reissuance of the CL command until the synchronized searches find no conflict in all SC copy directories in the MP. FIG. 9C represents the sequence of operations in the issuing IE, BCE and SC if an MP cache conflict is indicated by the output of OR circuit 138, in which case resend trigger 101 transmits a resend signal back to the issuing IE unit, i.e. IE(I), which causes IE(I) to reissue the same CL command to BCE(I), instead of the next command that the IE(I) would have issued. When the resend command is reissued, the basic operations represented in FIG. 9B are repeated.

In FIG. 9B, after the resend signal is provided, the BCE(I) may not immediately accept the CL command being reissued while the BCE(I) is performing the invalidate line (IL) operations represented in FIG. 9C; and after their completion, BCE(I) permits the transfer of the reissued CL command into its command register 55.

FIG. 9A represents the final sequence of operations whenever the simultaneous search in all copy directories during time 5 in FIG. 9B finds that no MP conflict exists, in which case accept trigger 104 is set which then causes IE(I) to transfer the double word of pad data in its data register 17 to BCE(I) register 55 in FIG. 5, which is then transmitted to the SC(I) PIR 87 in FIG. 6A and then to main storage via gate 89 and storage input register (SIR) 90 on succeeding cycles, as represented in FIG. 9A.

Most CL command requests are likely not to find any conflict, in which case only the sequences in FIGS. 9B and 9A occur. Whenever a conflict is found in any copy directory, the sequences in FIGS. 9C and 9D also occur, and the sequence in FIG. 9E occurs if any remote SC is busy, which causes the resend command to issue in SC(I).

The other aspects of the sequence diagrams in FIGS. 9A through 9E are considered self-explanatory in view of the prior explanation of the embodiment.

FIG. 7 illustrates the manner in which a BSM controller (BSC) may accumulate a line of data from an SC a double word (DW) at a time alternately through an odd DW register 171 and an even DW register 172, until a line of 16 doublewords is accumulated in a BSM line register 151. Then register 151 stores the line as a unit into a BSM board.

The writing of one line into the BSM completes the execution of one CL command. The execution of the SVP CL instruction or a user instruction such as the MVCL results in the execution of plural CL commands as determined by the IE in the manner previously explained.

FIG. 10 shows another arrangement of the BSC for handing a clear line operation which enables faster access to MS than the BSC arrangement in FIG. 7. FIG. 10 provides a parallel replication of the pad DW in data register 162 in one machine cycle instead of the serial replication requiring 16 machine cycles done in the BSC in FIG. 7. In FIG. 10, when the CL trigger 163 in the BSC is set by a CL command in the BSC command register 161, the pad DW in register 162 is transferred in a fanout manner into all sixteen DW locations in BSM line register 151 during the one machine cycle of enablement of gates 181-0 through 181-15 by CL trigger 163.

In a UP where one copy directory exists, or no copy directory exist, the invalidation in the processor cache directory can occur when the CL command is issued without the SC(I) and BCE(I) invalidate line (IL) commands being used as previously discussed (which are required in a MP). Thus, in a UP, the inhibit gate 59 may be connected to the miss output of the directory 62 to inhibit the formation of any line fetch request from the SIC to MS but can allow a search of the processor cache directory for locating the existence of the line to be invalidated (but not for determining the absence of the line for a fetch request).

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. Means for clearing an area in shared main storage (MS) in a data processing system having plural central processing units (CPUs), each CPU having a store in cache (SIC) with a CPU cache directory and SIC controls, comprising means for inhibiting any line fetch for the SIC when a clear storage (CS) command is issued by the associated CPU to requested SIC controls to clear an addressed area in MS, means for requesting MS to write over a MS area with a data value determined by the CS command, a system controller (SC) connected to a plurality of CPUs for receiving storage and special commands issued by the SIC controls including a CS command issued by any connected CPU, a plurality of copy directories being included in the SC, each copy directory being a copy of an associated CPU cache directory in a connected CPU, SC means for simultaneously searching the plurality of remote copy directories (relative to the requesting CPU's copy directory) for a requested address in response to each received command requesting a directory search, including a CS command, to find any conflicting address, conflict signalling means in the SC being actuated by the SC means finding any conflicting address in any remote copy directory for signalling a conflicting address with an invalidation signal to the associated remote CPU's SIC controls, SC controls for communicating any invalidation signal to the requesting CPU's SIC controls to cancel the MS requesting means, invalidation means with each SIC controls for invalidating any corresponding entry at the conflicting address in the associated remote CPU cache directory, SC signalling means with the remote SIC controls for providing a confirmation invalidation signal to the associated SC means to invalidate the entry at the conflicting address found in the the associated remote copy directory, and means for enabling the MS requesting means to write the requested data value over the MS area addressed by the CS command when the SC controls communicate to the requesting CPU SIC controls of the completion of invalidation for every conflicting entry in each remote CPU cache directory and associated copy directory, the MS area being cleared by a single CS command being equal to the area in any SIC which may be invalidated by the CS command.

2. Means for clearing an area in MS as defined in claim 1, further comprising processor identifier means in the SC for identifying the processor issuing a current command, resend signalling means in the SC for signalling the issuing processor currently identified by the processor identifier means to resend the CS command in order to prevent the issuing processor from sending any other command until completion of invalidation in all cache directories in the data processing system.

3. Means for clearing an area in MS as defined in claim 2, in which the invalidation means with each SIC controls in each CPU further comprises a first priority circuit which determines which request or command can next access the CPU cache directory.

4. Means for clearing an area in MS as defined in claim 3, in which the SC means further comprises a second priority circuit which determines which request or command can next access all copy directories in parallel in the SC.

5. Means for clearing an area in MS as defined in claim 4, further comprising at least one remote SC constructed similarly to the previously mentioned SC and being also provided in the data processing system for accessing MS, each remote SC being exclusively connected to one or more CPUs for receiving storage and special commands issued by the SIC controls in any connected CPU, SC interconnecting means for connecting the SCs and communicating a cross-interrogation (XI) request from any SC to the second priority circuits in each remote SC, including a CS command received by any SC, means in the remote SC for simultaneously searching each copy directory in the remote SC in response to a received XI request due to a CS command requesting a directory search, the conflict signalling means in the remote SC being actuated by the SC means finding the requested address in any copy directory and signalling any found invalidation address to the other SC on the SC interconnecting means, the second priority circuit giving XI requests high priority to allow searching of local and remote copy directories at substantially the same time.

6. Means for clearing an area in shared MS as defined in claim 1, further comprising the MS area being cleared and any SIC area being invalidated by one CS command being a cache line.

7. A multiprocessing (MP) system having a plurality of central processors (CPUs), each CPU having a store-in-cache (SIC) with an SIC directory and SIC controls, comprising:

CPU command means for sending CPU requests including clear storage (CS) requests to the associated SIC controls to request MS to write over a MS area with a data value determined by a CS command making a CS request, inhibit means associated with a requesting CPU's SIC controls to inhibit any cache miss by the associated SIC directory in response to a CS request in order to prevent a line fetch or line castout from occurring in response to a CS request, storage control (SC) means connected between an associated set of the CPUs in the MP and a MP system storage (MS), copy directories provided in the SC means, each copy directory being a copy of an associated SIC directory for a CPU, SC priority means in each SC means for priority serializing associated CPU requests from the connected set of CPUs, search control means in each SC means connected with the SC priority means to control which request next searches the copy directories in the SC, cross-interrogation (XI) means connected between the copy directories for transferring each CS request from a requesting CPU to the SC priority means, the SC priority means providing equal or higher priority to a CS request than other CPU requests, whereby high priority for the CS request causes searching in all remote copy directories to be synchronized in all SCs, search control means for each copy directory to determine if the CS request exists as a conflicting entry in any remote copy directory, conflict sensing means in the SC means actuated by a conflicting entry found by a search control means to provide a conflict signal to an associated SIC directory, SC controls for communicating any conflict signal to the requesting CPU to cancel the CS command and its request to MS and to cause reissuance of the CS command by the requesting CPU command means, invalidation means with each remote SIC controls being actuated by a conflict signal from the conflict sensing means to invalidate any conflicting entry in the associated remote SIC cache directory and in the associated copy directory without any corresponding castout, the MS area addressed by the currently active CS command being cleared when the SC controls do not communicate any conflict signal to the requesting CPU to cancel the CS command so that the command completes with its write request to MS.

8. A MP system as defined in claim 7, further comprising storage request means in each SC means for transferring each associated clear storage request to MS, resending means in each SC means for providing a resend signal to the CPU command means in the CPU which issued the CS command to require the issuing CPU to reissue the CS command when a conflicting address is signalled in the MP, whereby the reissue causes an extension in the time of execution of the CS command until all directories in the MP have been searched without finding any conflicting address, MS request cancelling means being actuated by the resending means to cancel the clear storage request to MS, and acceptance means in each SC means for signalling each associated CPU when no conflicting address is found, whereby the MS request cancelling means is not actuated and thereby the clearing operation in MS is permitted.

9. Means for clearing an area in shared MS as defined in claim 8, further comprising the size of the MS area being cleared and of any SIC area being invalidated being one line per executed CS command, whereby the CS command is a clear line command.

10. Means for clearing an area in shared MS as defined in claim 9, further comprising a MS data register receiving pad data transferred from the SC, a MS line register for transferring a line of data to the addressed line in MS, means for replicating the pad data in the MS data register into each data position in the MS line register to enable clearing a line of data in MS per CS command.

11. Means for clearing a line area in shared MS as defined in claim 10, further comprising the MS data register receiving a double word containing the pad data in every byte position, the MS data register being serially replicated into every double word position in the BSM data register for clearing a line of data in MS per CS command.

12. Means for clearing a line area in shared MS as defined in claim 10, further comprising the MS data register receiving a double word containing the pad data in every byte position, the MS data register being replicated in parallel into every double word position in the MS data register in one machine cycle to form a line of pad data.

13. Means for clearing a line at a time in main storage (MS) in a data processing system having a central processor (CPU) with a store-in-cache (SIC) having a processor cache directory and cache control means, comprising:

cache control means for connecting the processor cache directory and SIC to the processor and MS, command means for providing processor storage requests and a special clear line (CL) command to the cache control means, the CL command containing a MS line address to be cleared, inhibit means associated with the cache control means to inhibit the processor cache directory from having any fetch from MS when the command means issues the CL command, invalidating means in the cache control means operating to invalidate any line in the SIC having the MS line address without any castout of the line content, whereby the CL command is sent to MS to overwrite the line in MS with pad data regardless of whether the line exists in the associated SIC.

14. Means for clearing a line at a time in MS by a CPU having a SIC as defined in claim 13, further comprising:

copy directory means having a copy of the processor cache directory for receiving the CL command and determining the existence of the requested line in an associated cache, MS request means associated with the copy directory means for transferring the CL command from the cache control means to MS for clearing the line in MS defined by the CL command, and means associated with the copy directory means for generating an invalidation line request to the associated processor cache directory for controlling the invalidation of any existing corresponding line in the associated SIC.

15. Means for clearing a line at a time in MS by a CPU having a SIC as defined in claim 14, further comprising:

means associated with the processor cache directory for generating an invalidation line request to the copy directory means after invalidating a line in the processor cache directory.

16. Means for clearing a line at a time by a CPU having a SIC as defined in claim 13 in order to execute a clear storage instruction, further comprising:

instruction control means in the CPU for actuating the command means to issue a sequence of CL commands addressed to different areas of MS to replicate and control the storing of predetermined pad data in each byte location of of an area in MS defined by the clear storage instruction, the inhibit means responding to each CL command by inhibiting the SIC from requesting or receiving any fetch of data from MS during execution of any CL command, whereby MS is validated by the storing of the pad data in each byte location in the instruction addressed area in MS before any fetching can occur from the area in MS during the execution of the clear storage instruction.

17. Means for clearing MS by a CPU having a SIC as defined in claim 13, further comprising a system service processor having a service bus connected to the instruction control means for controlling the operational mode of the CPU including a storage validation mode, means connecting the service bus to a microcode select circuit for a control store in the CPU, the microcode select circuit selecting a service processor controlled clear line routine of microwords when in the storage validation mode, whereby no fetching is required from MS for execution of any CL command while in storage validation mode.

18. Means for clearing MS by a CPU having a SIC as defined in claim 13, further comprising a system service processor having a service bus connected to the instruction control means for controlling the operational mode of the CPU including a normal instruction processing mode, and means connecting the service bus to a microword select circuit for a control store in the CPU, the microword select circuit selecting an instruction controlled clear line microroutine of microwords when in normal instruction processing mode, whereby an instruction being executed which issues a clear line command is previously obtained from MS by an instruction fetch for clearing an area in MS.

19. Means for executing a clear storage instruction as defined in claim 16, further comprising:

the instruction control means replicating the clear line command for a sequence of line addresses beginning on a block boundary of main storage specified by an address of the instruction, whereby the clear storage instruction replicates the clear line command to write the predetermined pad data through a single block area in MS.

* * * * *